Figure 1:
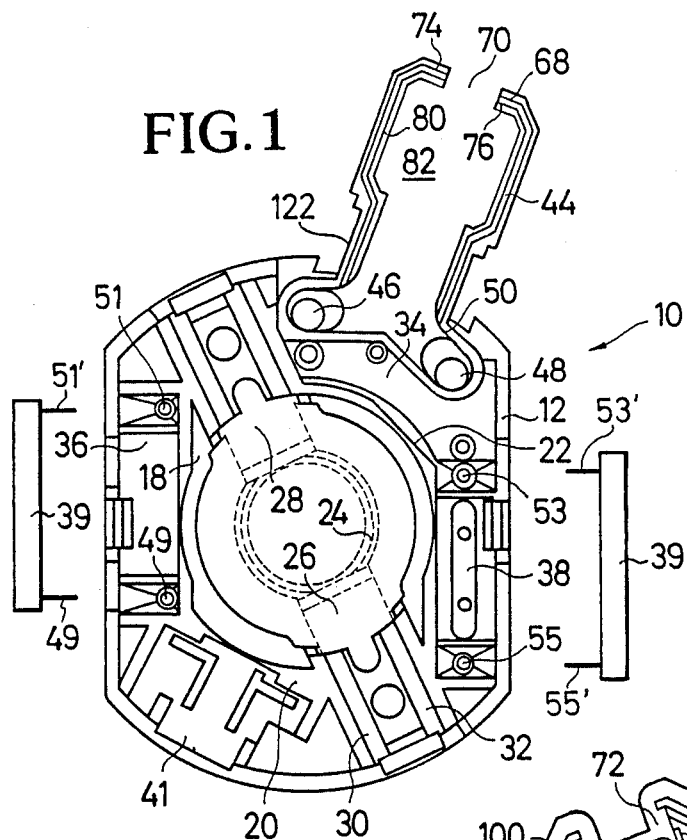

United States Patent [19]

Koster

[11] Patent Number: 4,978,876

[45] Date of Patent: Dec. 18, 1990

[54] CUP-SHAPED SUPPORT FOR AN ELECTROMOTOR

[75] Inventor: Walter Koster, Ganderkesee, Fed. Rep. of Germany

[73] Assignee: Schunk Motorensysteme GmbH, Ganderkesee, Fed. Rep. of Germany

[21] Appl. No.: 330,904

[22] Filed: Mar. 31, 1989

[30] Foreign Application Priority Data

Mar. 31, 1988 [DE] Fed. Rep. of Germany ....... 3810961

[51] Int. Cl.⁵ ..................... H02K 15/06; H02K 13/00
[52] U.S. Cl. ..................... 310/239; 310/43; 310/89
[58] Field of Search ............ 310/43, 89, 239, 71, 310/91, 66, 72; 361/380, 395

[56] References Cited

U.S. PATENT DOCUMENTS 4,355,253  10/1982  Vollbrecht ..................... 310/43
4,673,837  6/1987  Gingerich et al. .............. 310/239

Primary Examiner—Steven L. Stephan
Assistant Examiner—D. L. Rebsch
Attorney, Agent, or Firm—Dennison, Meserole, Pollack & Scheiner

[57] ABSTRACT

For equipping an electromotor to the desired extent with especially electronic elements, like radio shielding devices, a cup-shaped support (10) made of synthetic material concentrically surrounds the commutator (24), being of double-walled construction in order to provide chambers (34, 36, 38, 41) for lodging these elements. Guide channels (49, 51, 53, 55) extend from the chambers, via which electric connection lugs of the elements reach a preferably deep-drawn grid mounted on the outer surface of the support.

10 Claims, 4 Drawing Sheets

FIG.6a
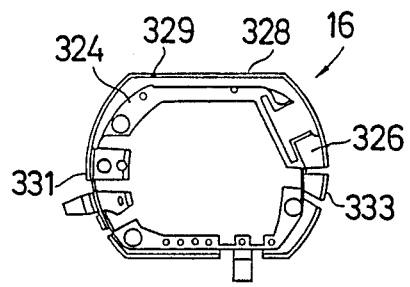
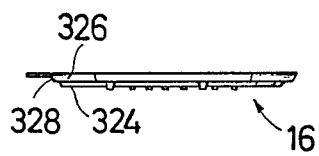
FIG.6b

CUP-SHAPED SUPPORT FOR AN ELECTROMOTOR

The invention relates to a cup-shaped support of plastic material intended for an electromotor, like a permanent magnet-excited motor, for the housing of carbon brushes co-operating with the commutator of the motor, electric and electronic elements, e.g. for spark shielding, as well as the conductive lines connecting these elements.

The European patent application Ser. No. 109 538 refers to an electric tool with a cup-shaped support of the above described kind. The electric connection of the elements is effected by wirings, resulting in a curtailment of the switching of the electric elements. Likewise little opportunity is offered for placing the elements in the support compactly and without any problems. This is especially a disadvantage as far as largely fully automatic assembly lines are concerned.

It is the object of the present invention to design a cup-shaped support of the initially mentioned kind in such a manner that the carbon brushes and the electric and electronic elements in the desired extent can be operated with the electromotor without any problems without requiring any more space as compared to known supports. At the same time it shall be possible to permit a single assembly of the support or, resp. of the conductive lines.

Essentially this problem is solved in that the lodging chambers having openings extending in the direction of the bottom region of the support to its bottom area, serving as guides for connection lugs; that the bottom area at its outer surface is provided with a grid made of plate material and forming the conductor paths, and that the support can be sealed with a covering element on the top or front face of the support opposite to the bottom area, at the very least, where on the outer surface of said covering element a flat packing seal can be arranged.

Consequently, according to the invention, the support is designed in such a manner as having chambers extending essentially coaxially to the rotor shaft of the motor, in which chambers the electric and electronic elements and switching necessary for e.g. radio shielding or a speed control, can be arranged one upon the other and/or side by side. With this construction of the support a housing is provided for the elements, which obviously, on the one hand, facilitates an assembly and, on the other hand, offers a chance of arranging the elements, or resp. the switchings tightly packed around the shaft or, resp. the commutator. Consequently switching possibilities are offered within the most narrow space that, otherwise, can only be made available by arrangements of much larger constructional design.

Especially the invention is distinguished by the fact that the grid is a sheet metal part deep-drawn at least single stage/wise. Therefore, the conductor paths can run in different planes regionally angled off with respect to each other, and at least partially following the course of a curve. Due to the fact that the grid is a part preferably multi-step deep-drawn, conductor paths can extend in different planes on the most narrow space. With, e.g., an arc shape, one can easily obtain a channel-shaped structure, that with prior art stamped grids could be realized only to a very restricted extent, namely if the plane plate material first gets recesses along the arc shape, by which the groove-like geometry would be possible without any formation of folds. All these measures are no longer necessary when using a deep-drawn grid. In addition, a compactness of conductor paths can be achieved that cannot be obtained by a punched grid.

Special attential is called to still another embodiment of the invention where the cables supplying the motor with power are running completely within the seal which is under pressure from both sides. Also in this area the cables are insulated and preferably tinned. Such a solution is of special advantage then when the electromotor is lodged in composite housings, where the seal is extending between frontal sides of the housings facing each other; said seal being made of compressible elastic material. By this measure it is no longer necessary to have a cut-out on one sidewall of the housing through which the cables are led. Namely, by such respective measures one runs the risk of leakages. The seal constructed according to the invention can here be made of a thermoplastic elastomer, especially of a dynamically netted polyolefinic elastomer.

In order to guarantee a space saving laying of cables in the support, it is furthermore suggested to lead the electric lines of the cable in bore holes of the support extending parallel to the longitudinal axis of the shoulder, at a distance to each other and outside of said shoulder, to the grid arranged on the front face of the support distant from the cover element. Hereby, the electric lines between the shoulder and the bore holes can be covered by bridge-shaped walls extending in direction of the front face, which preferably on the inside are cooperating with projections protruding from the inner surface of the covering element, in order to fix its position.

In order to direct the connection lugs of the electric elements to be placed in the chambers or recesses almost automatically to the grid being arranged in the bottom area of the support, the chambers have openings on the bottom surface preferably of conical tapering, which are serving as guides for the connection lugs. Once an electric element from above is placed into a chamber, then the connection lugs will automatically slide through the openings to the grid, in order to be there electrically connected, which e.g. can take place in a soldering bath. By this measure an assembling disposition is manifested enabling an almost fully automatic flow of production.

Concerning the deep-drawn grid itself, the following should be noted. Hereby the chance is offered of making available a three-dimensional grid of almost any design whatsoever, by means of which one will have a high density of conducting paths within the most narrow space. At the same time, the drawn grid preferably can be of cup-shape design and with its preferably conically extending edge sections protrude into the bottom area of the support, in order to be fixed in position there and connected with the electric elements or, resp. the brushes, while the individual current paths partially only thereafter by an aimed disconnection of the drawn grid when it has been accepted by the support.

Furthermore the invention refers to a method of assembling a cup-shaped support of plastic material, designed for an electromotor for e.g. an electric tool or a sash lifter, with carbon brushes and electric and electronic elements, being arranged in chambers and/or recesses of the support and switched by means of conductor paths.

Such a method is distinguished by the following steps:

placing the electric and electronic elements in the chambers or recesses having openings and extending to the bottom area of the support, where the connection lugs of the elements are interspersing the openings and are protruding with their free ends on the outside above the bottom area of the support.

arranging a grid forming the conductor paths from the outside on the bottom area of the support and fixing the same.

electrically conducting connection of the connection lugs with the grid, and cutting out the grid areawise for obtaining the necessary conductor paths.

Before making the cuts in the grid, the free ends of the connection lugs projecting over the grid can be cut off. The electrically conducting connection of the connection lug and grid is preferably made in a soldering bath. By all these measures a fully automatic mounting operation can take place.

Figure 2:
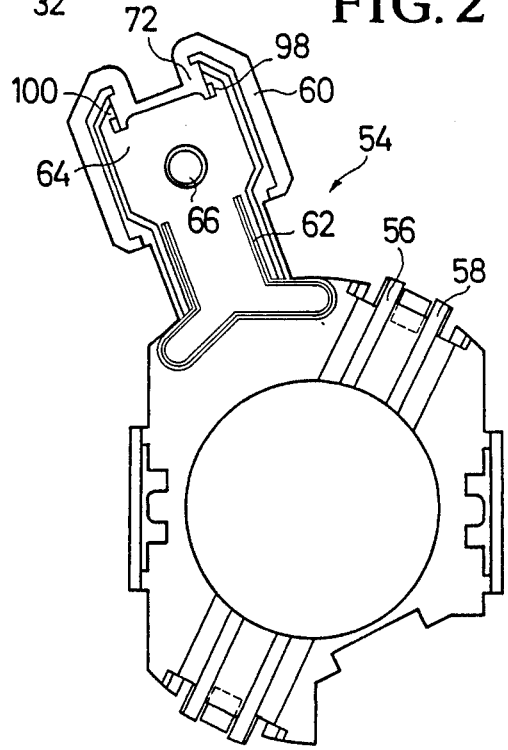
Figure 3:
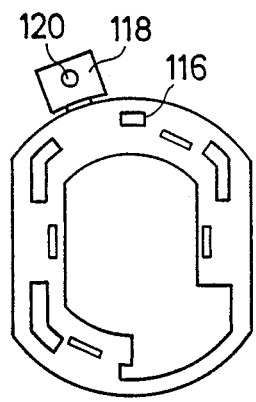
Figure 4:
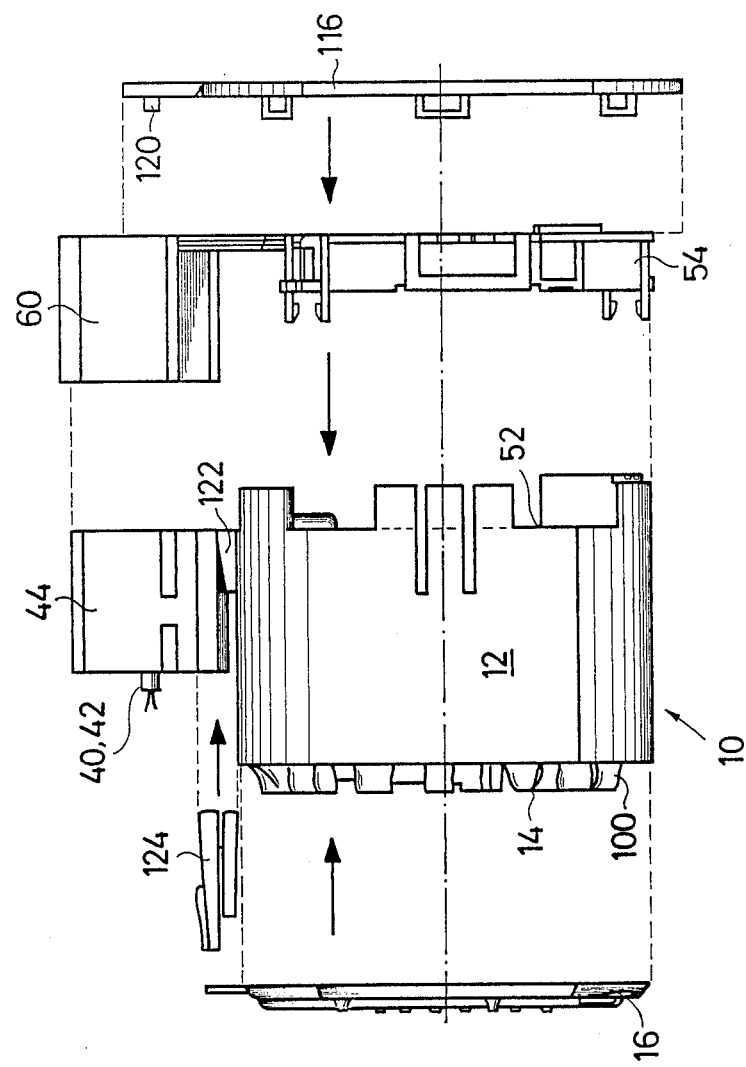
Figure 5:
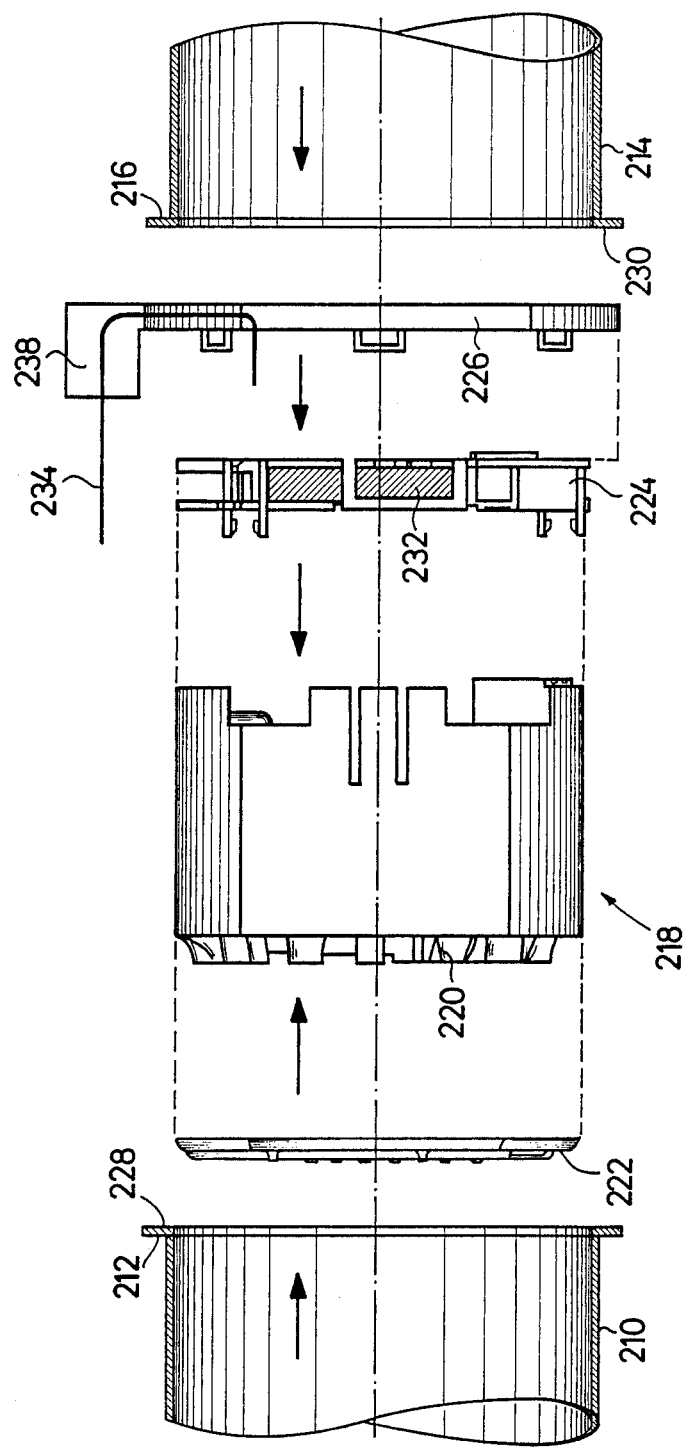

Further details, advantages, and features of the invention will result not only from the claims, the characteristics to be taken therefrom, by itself and/or in combination, but also from the following description of preferred embodiment examples illustrated in the drawings, where FIG. 1 is a front elevation of the support according to the invention, FIG. 2 shows the inner surface of a covering element covering the support according to FIG. 1, FIG. 3 shows, a seal to be arranged on the outer surface of the cover according to FIG. 2, FIG. 4 is, an extended view of the support, the cover and the sealing element according to FIGS. 1 to 3, with grid and another seal, FIG. 5 still another embodiment of a support with cover, seal and grid, in extended view, and FIGS. 6a and b are top and side views of a grid.

In FIG. 1, a pot-shaped or cupshaped support 10 made of synthetic material is illustrated, having a cylindrical jacket 12 and a bottom surface 14, partially housing a grid 16 (FIG. 4) which preferably is a deep-drawn part. Due to this manner of manufacture, a three-dimensional grid is made available presenting a great number and density of conductor paths.

The housing of the support 10 may in places be of double-wall construction in order to receive electrical and electronic components. In the graphic illustration this is exemplarily indicated by the walls 18, 20, or 22. In the main, the walls are running concentrically to the commutator 24 of an electromotor housed by the support 10, to which motor carbon brushes 26 and 28 are adjacent. The carbon brushes 26 and 28 are lodged by guidance in bridge-shaped walls, being marked, for example, with the references 30 and 32.

Due to the double walls of the housing of the support 10, one obtains a plurality of chambers, which again, for example, are marked with the references 34, 36, 38, and 41. In these chambers there can be arranged electric and electronic elements 39, like condensers, screening chokes, heat sensors, or likewise an electronic speed control.

Hereby the chamber construction guarantees that the elements can be easily arranged and eventually fully automatically and extremely compact, in order to be connected with the conductor paths of the grid 16 and via electric lines 40, 42 (FIG. 4) of a cable with a voltage source or, resp. the carbon brushes 26 and 28.

In order to lead the connection lugs of the electric elements without any problems outward to the grid 16, openings are provided in the bottom area of the chambers, which likewise, for example, are marked with the references 49, 51, 53, and 55. These openings acting as guiding and connecting channels tapering toward the bottom, do serve as guides for the electric connections, like connection lugs 49', 51', 53' and 55' whereby an automatic sliding of these elements into the chambers takes place when inserting them from the open front face of the support 10, and where, at the same time, the connection lugs arrive at the outside, while being led through the openings 49, 51, 53, 55 that can also be called guiding channels. This offers the chance of an automatic placing of the electric elements so that a manual mounting is not necessary. The construction of the chambers and the arrangement of the openings available therein will be adjusted to the dimension and position of the elements to be installed. The electric lines 40 and 42 can be run into the support 10 via a lug 44 designed as a bushing, enter support 10 from the side opposite to the bottom 14, thus the one shown in FIG. 1, in order to be run via bores 46 and 48 tapering toward the bottom, to the bottom 14 and thus to the grid 16.

The area in which the electric lines 40 and 42 are running from the lug 44 to the bores or guide channels 46 and 48, is limited by a run round web-shaped wall 50 extending in direction of the open side, which consequently shows the geometry of a "Y".

The front face 52 of the support 10, via which the lines 40 and 42 are led into the housing of the support 10, is covered by a lid 54 (FIG. 4) that can be engaged with the housing of the support 10 via projections or, resp. recesses not specifically marked. The inner surface of the lid 54 further presents bridge-shaped projections 56 and 58 (FIG. 2) serving as guides for the carbon brushes 26 and 28 being arranged in the housing of the support 10. In addition, the lid 54 has a lug 60 engaging the lug 44 of the support 10 in the position of closing said support.

The inner surface of the lid 54 has a projecting web-shaped part 62 likewise following the geometry of an Y being adapted to the walls 50 of the housing in such a manner that the part 62 will be resting against the inner face of the wall 50. On the outside the lug 60 has a cover surface 64, provided with an opening like a bore 66.

The cover surface 64 is tubularly designed with open front faces and has a slit 70 through the outer surface turned away from the corner outer face 68. Adapted to this geometry, a projection 72 is starting from the lug 60 of the lid (54), that can be inserted in the slit 70 and, at the same time, will engage the marginal areas 74 and 76 of the slit 70. Consequently, by means of the support 10 covered with the lid 54, a chamber is provided by the lugs 44 and 60 being interspersed with electric lines 40 and 42, said chamber being closed on the top by the surface 64 and on the bottom by a clamping seal 78.

On the outside the lid 54 is covered by a flat seal 116, FIGS. 3 and 4, comprising a laterally protruding section 118 with a projection 120 extending in direction of the lug 60, which projection can be engaged in the opening 66.

The lug 44 is connected with the outer wall 12 of the support 10 via a bridge 122. In the space between the lug 44 and the outer wall 12 a seal 124 is arranged surrounding the bridge 122, which on its part having a slit thus being of U-cross section, in order to arrange the support 10 in a motor housing from which the lug 44 is laterally protruding. The opening in the motor housing provided for the bridge 122 is then tightened by the seal 124.

In order to obtain a complete unit composed of support 10, lid 54, as well as seals 116 and 124, the individual parts must be assembled according the illustration according to FIG. 4. In order to simplify the mounting operation, according to still another suggestion of the invention, the lid 54 with the flat seal 116 and the support 10 with the seal 124 each will be produced in a two-component injection molding so that the mentioned four components are reduced to two. This two-component injection molding can be a hard/soft/hard injection. The parts produced in such a manner will facilitate the mounting and, in addition, will guarantee that especially the seal is coordinated in exact position with the lid 54 or, resp. the bridge 122.

In the embodiment example according to FIG. 5 to which special attention must be called, wherein exploded view parts of preferably a motor-gear-unit are shown for a damp-proof assembly. To this effect, a pot-shaped housing 210 with a flanged rim 212 is designed as a motor casing, in order to house, e.g., a permanent-magnet commutator motor. The housing 214 to be connected with the motor housing 210 and preferably accommodating a gear, is likewise pot-shaped and provided with a flange-like edge 216. The assembling of the housings 210 and 214 can be effected by means of fastening elements (not shown) in reciprocal strain in such a manner, for example, shown in the EP-A-0 219 681. In the motor housing 210 a pot-or cup-shaped support 218 of plastic material is arranged, of which the bottom area 220 receives a grid 222 being preferably a deep-drawn part. Due to this kind of manufacture, a three-dimensional grid is made available offering a great number and density of conductor paths. The cylindrical wall structure of the housing 210 may in places be double-walled, in order to accommodate electric and electronic elements in exact position and tightly packed essentially concentric to a commutator of the electromotor housed in the support 218 in such a manner as to allow a largely automatic assembly thus making automatic production feasible.

On the front face of the support 218 a cover part 224 is firmly locked in position, preferably by means of catching lugs. On its outside the cover part 224 is provided with a seal 226, which either is lockably connected with the cover part 224 or rather made an integral part of the cover part 224 part being made of hard synthetic material while the seal 226 especially is a dynamically netted polyolefine elastomer. The seal 226 extends between the flange-shaped edges 212 and 216 thus resting on the respective front faces 228 and 230, and with the housings 210 and 214 put under strain, it is compressed to such an extent as to guarantee a sufficient tightness between the housings 210 and 214.

As an integral component the cover part 224 has a receptacle 232 for preferably receiving a speed regulating device for the electromotor in order to be equipped with the respective electric and electronic elements or not, subject to operational requirements.

The electric cables 234 to be passed into the inside of the housing 210 for connection to the carbon brushes or electric elements, like the speed regulating device, are run in the material of the seal 226 between the edges 212 and 216, so that the opening in the wall of the motor casing, as required according to prior art, is no longer necessary. In other words, the cables 234 pass through the material of the seal 226. In order to prevent a crushing of the cables 234, the seal 226 has a sufficient thickness. Thus the seal preferably has a thickness being 5 to 10 times, and preferably, 6 to 7 times thicker than the diameter of the strongest electric cable 234. For example, the thickness of the disc-shaped seal 226 can be 3 to 3.5 mm.

The grid 16, to which special attention is called, is deep-drawn and pot-shaped, as illustrated in the detail drawings according to FIG. 6.

Thus the grid 16 is composed of a bottom surface 324, parallelly to which a step 326 is extending followed by a conically enlarging circumferential wall 328.

Consequently the grid 16 is a multi-chambered construction with the base or bottom surface 324, the step 326, and walls following the step, which walls, especially after their mounting in a support and intersecting of individual regions, are subdivided into a plurality of electric conductor paths being separated from each other. Thereby the conductor paths can extend both in the individual planes running parallel to each other as well as vertically to them. This will result in a high density of conductor paths on the most narrow space enabling a comprehensive interconnection of the electromotor with e.g. screening units or other electric connection like e.g. a speed control.

Thus a current path 329 can run from point 331 to point 333. Consequently the current path 329 is curved and extending in a plane angled off to the base area 324. This can be effected by the deep drawing without giving rise to folds in the base area 324. With a punched grid, however, being bent rangewise, the course of a conductor path according to the path 329 would be impossible.

I claim:

1. A cup-shaped support made of plastic designed for an electromotor like a permanent magnet-excited motor for an electric tool or a sash lifter for lodging carbon brushes and electrical and electronic elements, being connected over connection lugs to conductor paths, where said carbon brushes and said elements cooperate with the commutator of the motor, and where said conductor paths are sections of a grid made of sheet material arranged at the bottom of the support, where
    said support has sectionally a double-walled configuration for forming housing chambers for the elements,
    said housing chambers have openings extending in the direction of said grid,
    said openings being guides for said connection lugs,
    said support can be locked at least sectionally by means of a cover element on the side opposite to said grid,
    said cover element has a flat seal on the outer surface,
    and where said support is completely arranged in a first housing part,
    the said first housing part is connected with the second housing part in the area of said cover element, and said first housing part is sealed by means of a flat seal from the second housing part.

2. A support according to claim 1, characterized in that the openings are conically tapering in the direction of the bottom area of the support.

3. A support according to claim 1, characterized in that the grid is an at least single stage deep-drawn sheet metal part.

4. A support according to claim 3, characterized in that the conductor paths are extending in different planes being areawise at an angle to each other, and following the course of a curve, at least partially.

5. A support especially according to claim 1, characterized in that the cover element and the seal being arranged on the outer surface, are constructed as a unit in a two-components injection molding.

6. A cup-shaped support made of plastic designed for an electromotor like a permanent magnet-excited motor for an electrical tool or a sash lifter for lodging carbon brushes and electrical and electronic elements, connection lugs for connecting said elements to conductor paths, where said carbon brushes and elements cooperate with the commutator of the motor, and where said conductor paths are sections of a grid made of sheet material coupled to the bottom of said support, said support defining sectionally a double-walled configuration for forming housing chambers for said elements, said housing chambers having openings extending in the direction of said grid, said openings forming guide ways for said connector lugs, said support being lockable at least sectionally by means of a cover element on the side opposite to said grid, a flat seal on the outer surface of said cover element, said support being completely arranged in a first housing part, said first housing part being connected with a second housing part in the area of said cover element, and means for sealing said first housing part.

7. A support according to claim 6, characterized in that said openings are conically tapered in the direction of the bottom area of said support.

8. A support according to claim 6, characterized in that said grid is at least a single stage deep-drawn sheet metal part.

9. A support according to claim 8, characterized in that said conductor paths extend in direction planes being areawise at an angle to each other, and partially following the course of a curve.

10. A support according to claim 6, characterized in that said cover element and said seals are arranged on said outer surface and being constructed as a unit in a two-components injection molding.

* * * * *